(12) United States Patent
Chen et al.

(10) Patent No.: US 11,334,112 B2
(45) Date of Patent: May 17, 2022

(54) ELECTRONIC DEVICE

(71) Applicants: Yan-Yu Chen, Taipei (TW);
Wang-Hung Yeh, Taipei (TW);
Yu-Wen Cheng, Taipei (TW);
Chun-Wen Wang, Taipei (TW)

(72) Inventors: Yan-Yu Chen, Taipei (TW);
Wang-Hung Yeh, Taipei (TW);
Yu-Wen Cheng, Taipei (TW);
Chun-Wen Wang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/869,554

(22) Filed: May 7, 2020

(65) Prior Publication Data

US 2020/0356141 A1   Nov. 12, 2020

Related U.S. Application Data

(60) Provisional application No. 62/845,288, filed on May 8, 2019.

(51) Int. Cl.
*G06F 1/16* (2006.01)

(52) U.S. Cl.
CPC ................. *G06F 1/1616* (2013.01)

(58) Field of Classification Search
CPC .... G06F 1/1616; G06F 1/1681; G06F 1/1679; G06F 1/1624; G06F 1/162; G06F 1/1637; G06F 1/1654; G06F 1/1667; G06F 1/1683; G06F 1/1618; G06F 1/1643; G06F 1/1662; G06F 1/1669; G06F 1/203; G06F 1/1626; G06F 1/1632; G06F 1/1656; G06F 1/1664; G06F 1/1677; G06F 2200/1614; G06F 1/1601; G06F 1/1615; G06F 1/166
See application file for complete search history.

(56) References Cited

U.S. PATENT DOCUMENTS 5,267,123 A * 11/1993 Boothroyd ............ G06F 1/1624
361/679.09
5,539,615 A    7/1996 Sellers
(Continued)

FOREIGN PATENT DOCUMENTS

| TW | M476959 | 4/2014 |
|---|---|---|
| TW | I526142 | 3/2016 |
| TW | I560540 | 12/2016 |

OTHER PUBLICATIONS

"Office Action of Taiwan Counterpart Application", dated Nov. 12, 2020, p. 1-p. 6.

*Primary Examiner* — Abhishek M Rathod
(74) *Attorney, Agent, or Firm* — JCIPRNET (57) ABSTRACT

An electronic device including a first body, a supporting member, a second body, and an input assembly is provided. The first body is provided with a front end and a rear end opposite to each other. One terminal end of the supporting member is pivotally connected to the rear end of the first body. The second body is pivotally connected to the other terminal end of the supporting member. The input assembly is rotatably connected to the second body and is suitable for being carried by the first body. When a lower edge of the second body is located at the front end of the first body, the input assembly protrudes out from the front end of the first body.

13 Claims, 7 Drawing Sheets

(56) References Cited

U.S. PATENT DOCUMENTS

| | | | | |
|---|---|---|---|---|
| 5,629,832 A * | 5/1997 | Sellers | B41J 11/56 |
| | | | 361/679.11 |
| 6,028,768 A * | 2/2000 | Cipolla | G06F 1/1616 |
| | | | 361/679.12 |
| 6,512,670 B1 * | 1/2003 | Boehme | G06F 1/1654 |
| | | | 361/679.29 |
| 7,457,108 B2 * | 11/2008 | Ghosh | G06F 1/1616 |
| | | | 248/921 |
| 7,511,950 B1 * | 3/2009 | Brekke | G06F 1/1616 |
| | | | 361/679.55 |
| 8,770,538 B2 * | 7/2014 | Hsu | G06F 1/1624 |
| | | | 248/685 |
| 2002/0080570 A1 * | 6/2002 | Riddiford | G06F 1/1624 |
| | | | 361/679.34 |
| 2004/0145862 A1 * | 7/2004 | Hill | G06F 1/1667 |
| | | | 361/679.44 |
| 2008/0043414 A1 * | 2/2008 | Ghosh | G06F 1/1679 |
| | | | 361/679.27 |
| 2010/0271770 A1 * | 10/2010 | Sellers | G06F 1/1664 |
| | | | 361/679.08 |
| 2013/0069878 A1 * | 3/2013 | Li | G06F 1/1616 |
| | | | 345/168 |
| 2013/0128442 A1 * | 5/2013 | Tseng | G06F 1/1681 |
| | | | 361/679.09 |
| 2013/0242495 A1 * | 9/2013 | Bathiche | G06F 1/1679 |
| | | | 361/679.28 |
| 2013/0314859 A1 * | 11/2013 | Huang | G06F 1/1616 |
| | | | 361/679.01 |
| 2014/0092540 A1 * | 4/2014 | Hung | G06F 1/1601 |
| | | | 361/679.05 |
| 2017/0115703 A1 * | 4/2017 | Lim | G06F 1/1616 |
| 2018/0299923 A1 * | 10/2018 | Kuo | F16M 11/38 |
| 2018/0356864 A1 * | 12/2018 | Lee | G06F 1/1681 |
| 2019/0294212 A1 * | 9/2019 | Oh | G06F 1/1647 |

* cited by examiner

ELECTRONIC DEVICE

CROSS-REFERENCE TO RELATED APPLICATION

This application claims the priority benefit of U.S. provisional application Ser. No. 62/845,288, filed on May 8, 2019. The entirety of the above-mentioned patent application is hereby incorporated by reference herein and made a part of specification.

BACKGROUND

Technical Field

The disclosure relates to an electronic device, in particular to an electronic device including bodies capable of pivoting relatively.

Description of Related Art

The design of bodies of notebook computers changes over time. Some notebook computers may be transformed into various modes for use through relative flipping and moving between bodies. In a notebook computer that is mainly designed to be used for drawing, the screen may be flipped to the upper part of the host, so that a large inclination angle is provided, and a user may is thereby allowed to perform a touch-control drawing operation on the display surface of the screen. However, when the screen is flipped to the upper part of the host, the keyboard on the host is blocked by the screen and may not be operated by the user.

SUMMARY

The disclosure provides an electronic device having an input assembly which can be operated by a user in various usage modes.

An electronic device of the disclosure includes a first body, a supporting member, a second body, and an input assembly. The first body is provided with a front end and a rear end opposite to each other. One terminal end of the supporting member is pivotally connected to the rear end of the first body. The second body is pivotally connected to the other terminal end of the supporting member. With pivoting of the supporting member relative to the first body and pivoting of the second body relative to the supporting member, a lower edge of the second body moves to the front end of the first body along the first body. The input assembly is rotatably connected to the second body and is suitable for being carried by the first body. When the lower edge of the second body is located at the front end of the first body, the input assembly protrudes out from the front end of the first body.

In one embodiment of the disclosure, one of the above second body and the input assembly is provided with a rotating shaft part. The second body and the input assembly are interconnected through the rotating shaft part.

In one embodiment of the disclosure, the above rotating shaft part and the other one of the second body and the input assembly are suitable for generating a magnetic attraction force to magnetically attract each other.

In one embodiment of the disclosure, the above rotating shaft part is provided with at least one electrical connection part. The electrical connection part extends on a surface of the rotating shaft part around an axial direction of the rotating shaft part. The input assembly is electrically connected to the second body through the electrical connection part.

In one embodiment of the disclosure, the above electrical connection part is disposed on the surface of the rotating shaft part.

In one embodiment of the disclosure, the above electrical connection part extends around an axial direction of the rotating shaft part.

In one embodiment of the disclosure, when the second body is closed down on the first body, the supporting member is received at an outer side of the second body, and the input assembly is received between the second body and the first body.

In one embodiment of the disclosure, with pivoting of the supporting member relative to the first body and pivoting of the second body relative to the supporting member, the lower edge of the second body moves to the front end of the first body along the first body.

In one embodiment of the disclosure, when the second body is opened up from the first body with the supporting member, the input assembly is carried by the first body, and a gap is provided between a free end of the input assembly away from the second body and the front end of the first body.

In one embodiment of the disclosure, when the supporting member is opened up from the first body, the second body is suitable for being opened up from the supporting member so that the lower edge of the second body abuts against the first body, and a free end of the input assembly away from the second body moves to the front end of the first body.

In one embodiment of the disclosure, the above electronic device includes a stop member, wherein the stop member is disposed at the front end of the first body. When the lower edge of the second body is located at the front end of the first body, the stop member stops the lower edge of the second body.

In one embodiment of the disclosure, the above stop member is rotatably connected to the first body and is suitable for rotating to at least partially protrude from the first body, so as to stop the lower edge of the second body.

In one embodiment of the disclosure, the above electronic device includes a magnetic member, wherein the magnetic member is disposed at one of the stop member and the lower edge of the second body. The stop member is suitable for rotating through the magnetic attraction force between the magnetic member and the other one of the stop member and the lower edge of the second body.

In one embodiment of the disclosure, the above stop member is provided with a first arm part and a second arm part. The magnetic member is disposed at the first arm part. The second arm part is suitable for protruding from the first body and stopping the lower edge of the second body with rotating of the stop member.

In one embodiment of the disclosure, the above second body is provided with an engaging convex part at the lower edge. When the stop member at least partially protrudes from the first body, the engaging convex part is suitable for being engaged between the stop member and the first body.

Based on the above, in the electronic device of the disclosure, the input assembly is not fixed onto the first body and is rotatably connected to the second body instead. When the lower edge of the second body moves to the front end of the first body along the first body so that the second body is provided with a large inclination angle, the input assembly is then pushed to the front of the first body by the second body to protrude out from the front end of the first body.

Accordingly, when the second body is provided with the large inclination angle, the input assembly is not concealed between the first body and the second body and thus may still be operated by the user.

DESCRIPTION OF THE EMBODIMENTS

Figure 1:
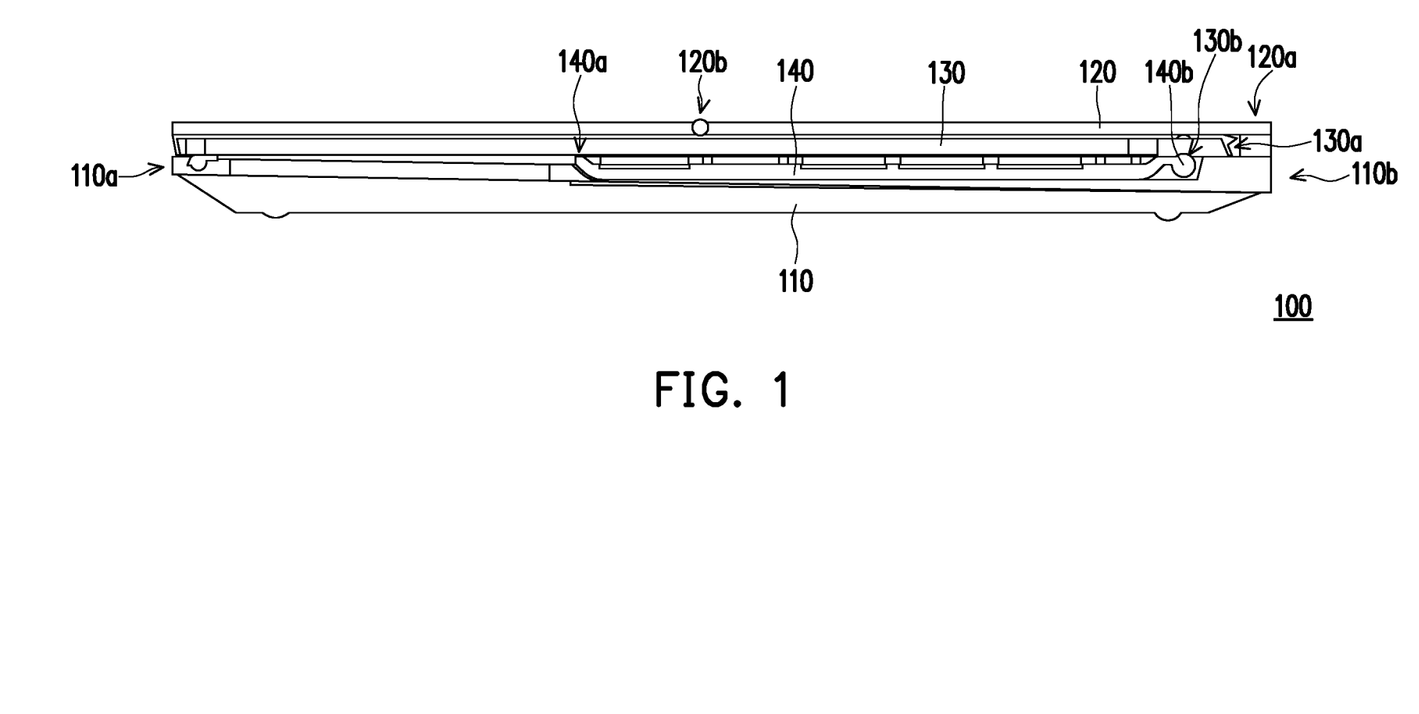
FIG. 1 is a side view of an electronic device according to an embodiment of the disclosure.
Figure 2A:
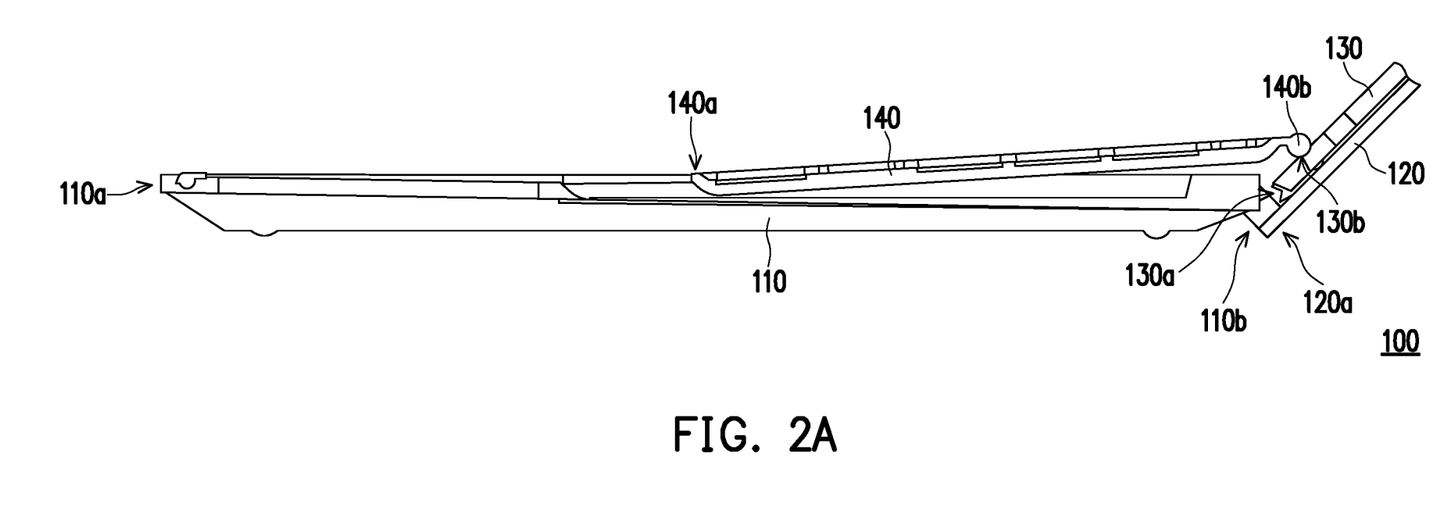
FIG. 2A to FIG. 2C illustrate different usage states of the electronic device of FIG. 1.
Figure 2B:
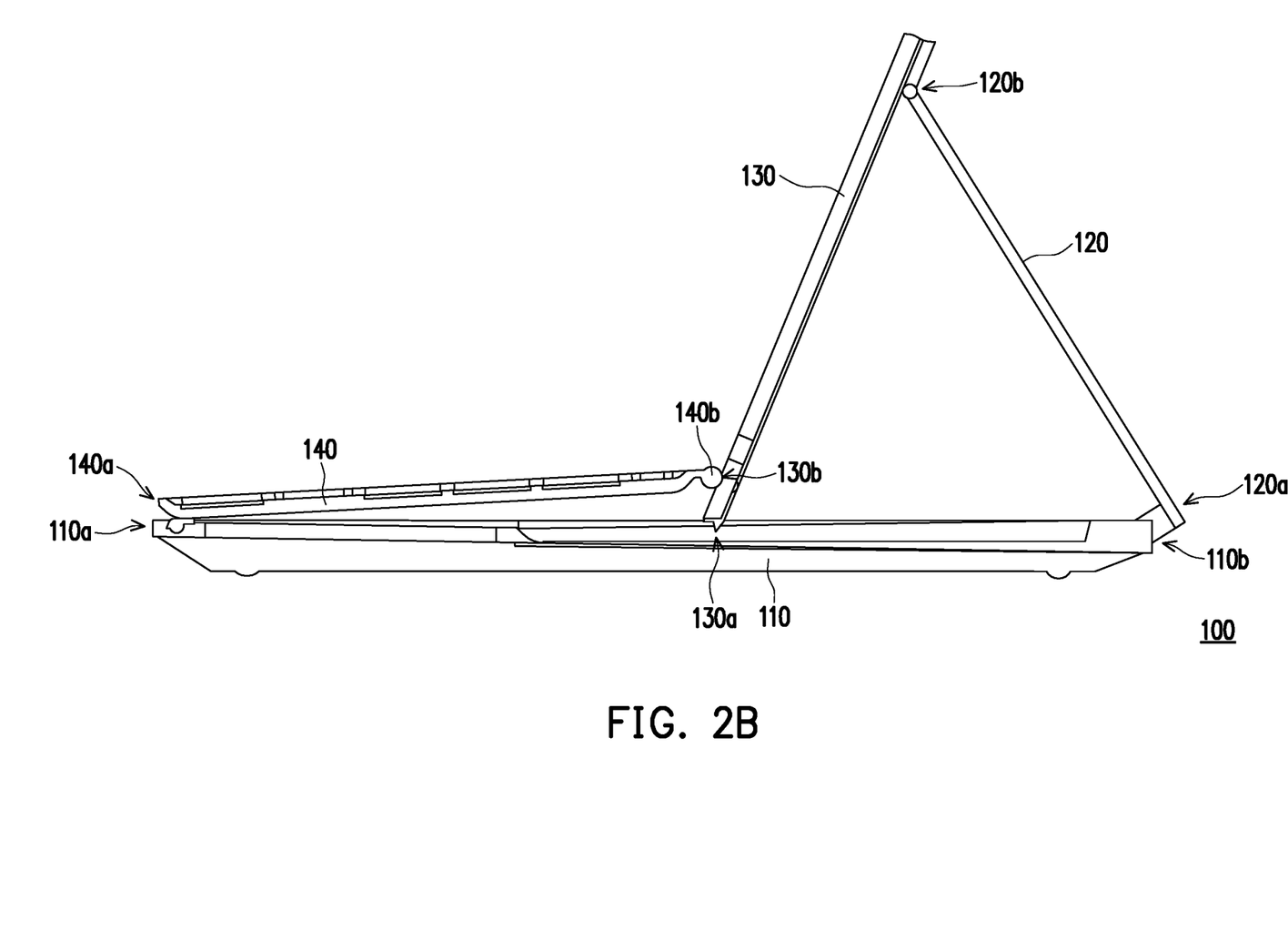
Figure 2C:
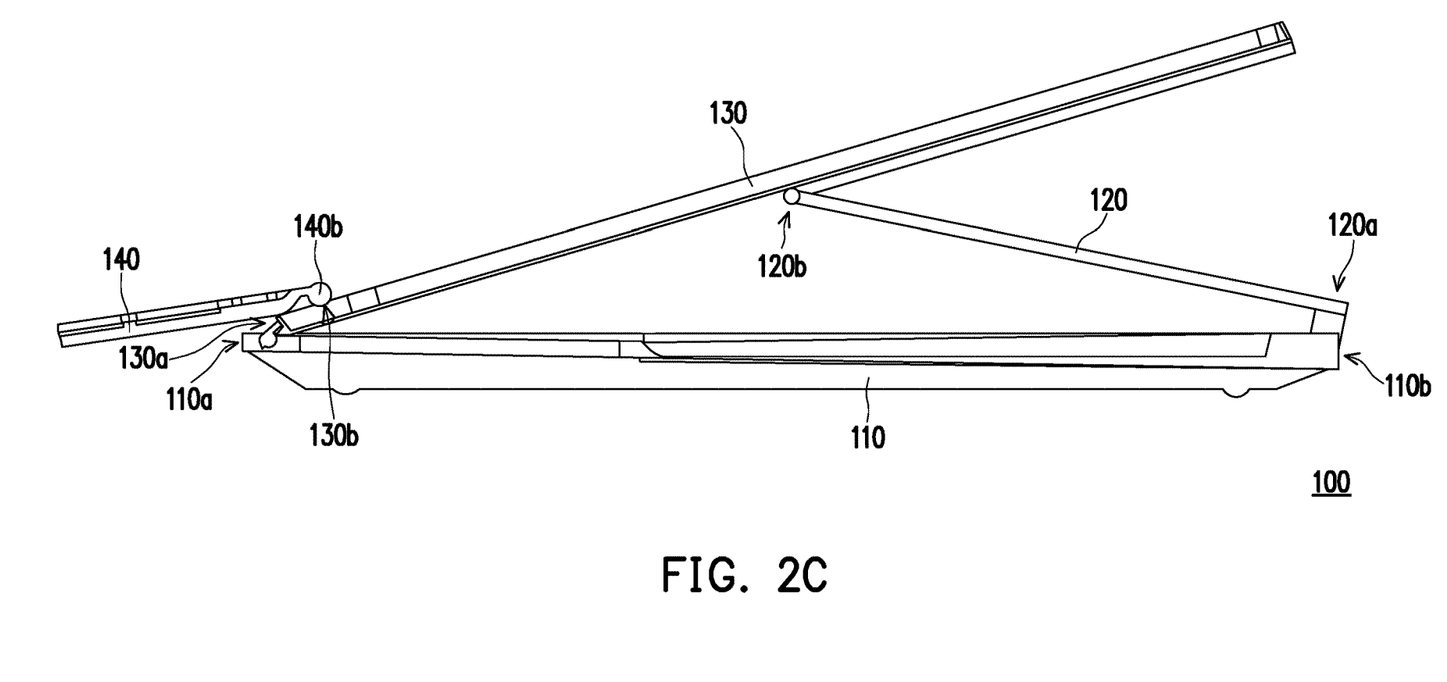

FIG. 1 is a side view of an electronic device according to an embodiment of the disclosure. FIG. 2A to FIG. 2C illustrate different usage states of the electronic device of FIG. 1. Referring to FIG. 1 and FIG. 2A to FIG. 2C, an electronic device 100 of the present embodiment, for example, is a notebook computer and includes a first body 110, a supporting member 120, a second body 130, and an input assembly 140. The first body 110, for example, is a host of the notebook computer and is provided with a front end 110a and a rear end 110b opposite to each other. One terminal end 120a of the supporting member 120 is pivotally connected to the rear end 110b of the first body 110. The second body 120, for example, is a screen of the notebook computer and is pivotally connected to the other terminal end 120b of the supporting member 120. The input assembly 140, for example, is a keyboard, and is rotatably connected to the second body 130 and is suitable for being carried by the first body 110.

When the second body 130 is closed down on the first body 110 as shown in FIG. 1, the supporting member 120 is received at an outer side of the second body 130, and the input assembly 140 is received between the second body 130 and the first body 110. In a closed state shown in FIG. 1, the electronic device 100 may be conveniently stored and carried around. When the second body 130 is opened up from the first body 110 with the supporting member 120 as shown in FIG. 2A, the input assembly 140 is carried by the first body 110, and a gap is provided between a free end 140a of the input assembly 140 away from the second body 130 and the front end 110a of the first body 110. In an opened state shown in FIG. 2A, a user may operate the input assembly 140 and the second body 130, and a region between the free end 140a of the input assembly 140 and the front end 110a of the first body 110 may be used by the user to put the hands on.

When the supporting member 120 is opened up from the first body 110 as shown in FIG. 2B, the second body 130 is suitable for being opened up from the supporting member 120 so that a lower edge 130a of the second body 130 abuts against the first body 110, and the free end 140a of the input assembly 140 moves to the front end 110a of the first body 110. In an opened state shown in FIG. 2B, the input assembly 140 and the second body 130 are operated by the user in a state of being closer to the user. As shown in FIG. 2C, with pivoting of the supporting member 120 relative to the first body 110 and pivoting of the second body 130 relative to the supporting member 120, the lower edge 130a of the second body 130 moves to the front end 110a of the first body 110 along the first body 110. At this time, the input assembly 140 protrudes from the front end 110a of the first body 110. In an opened state shown in FIG. 2C, the second body 130 has a large inclination angle so as to facilitate a touch-control drawing operation performed by the user on the second body 130.

Under the above arrangement manner, the input assembly 140 is not fixed onto the first body 110 and is rotatably connected to the second body 130 instead. As such, when the lower edge 130a of the second body 130 moves to the front end 110a of the first body 110 along the first body 110 as described above so that the second body 130 is provided with a large inclination angle, the input assembly 140 is then pushed to the front of the first body 110 by the second body 130 to protrude out from the front end 110a of the first body 110. Accordingly, since the second body 130 has a large inclination angle, the input assembly 140 is not concealed between the first body 110 and the second body 130 and may still be operated by the user. That is, in various usage modes shown in FIG. 2A to FIG. 2C, the input assembly 140 can be operated by the user.

In the present embodiment, the input assembly 140 is provided with a rotating shaft part 140b opposite to the free end 140a. The second body 130 and the input assembly 140 are interconnected through the rotating shaft part 140b. Specifically, the second body 130 is provided with a concave groove 130b corresponding to the rotating shaft part 140b, and the second body 130 may be provided with a magnet at the concave groove 130b. The rotating shaft part 140b includes a metal material which may be magnetically attracted. The rotating shaft part 140b and the concave groove 130b are matched, and the magnet and the rotating shaft part 140b generate a magnetic attraction force to magnetically attract each other, so that the input assembly 140 is stably connected to the second body 130. In other embodiments, the magnet may be disposed on the rotating shaft part 140b, and the second body 130 may include a metal material which may be magnetically attracted by the magnet at the concave groove 130b. Alternatively, the rotating shaft part 140b and the second body 130 may be both provided with magnets to magnetically attract each other, and the disclosure is not limited thereto.

Figure 3:
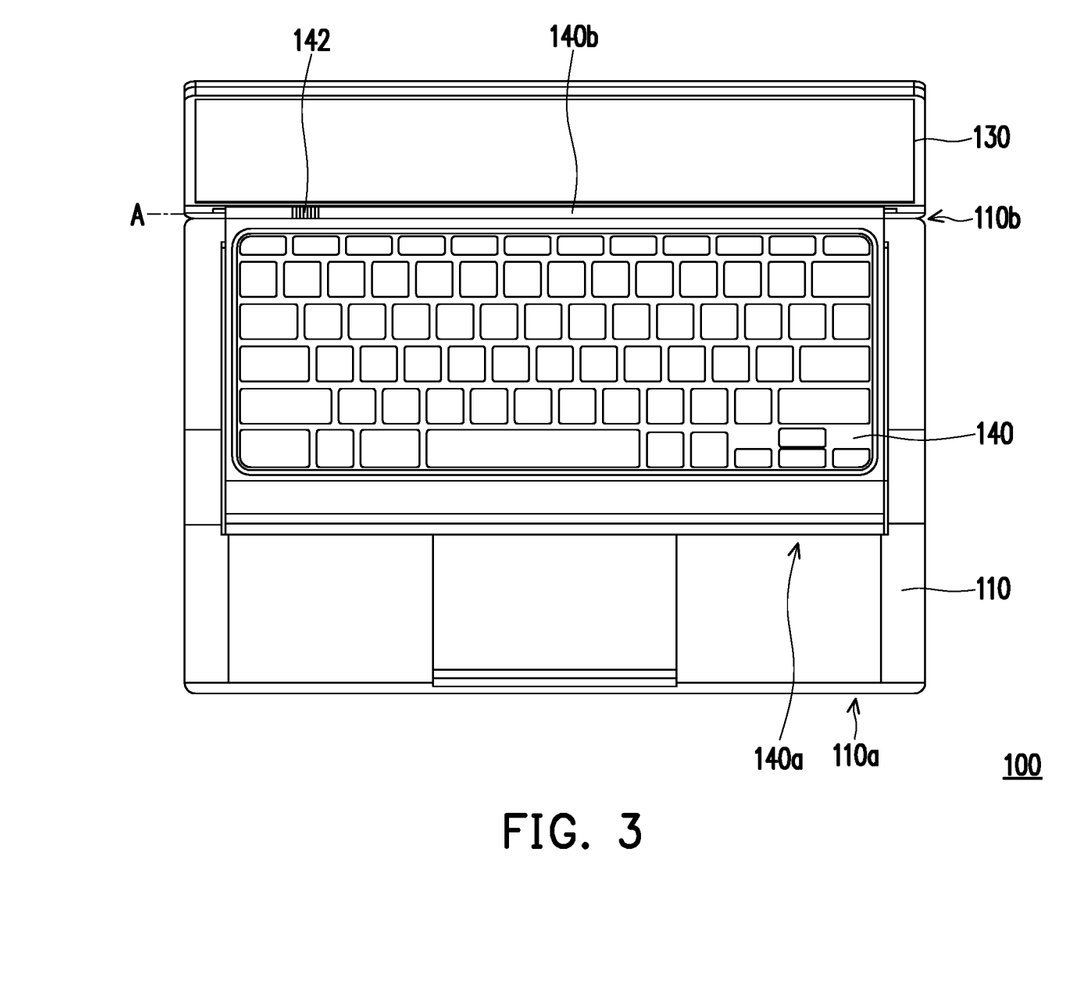
FIG. 3 is a top view of the electronic device of FIG. 2.
Figure 4:
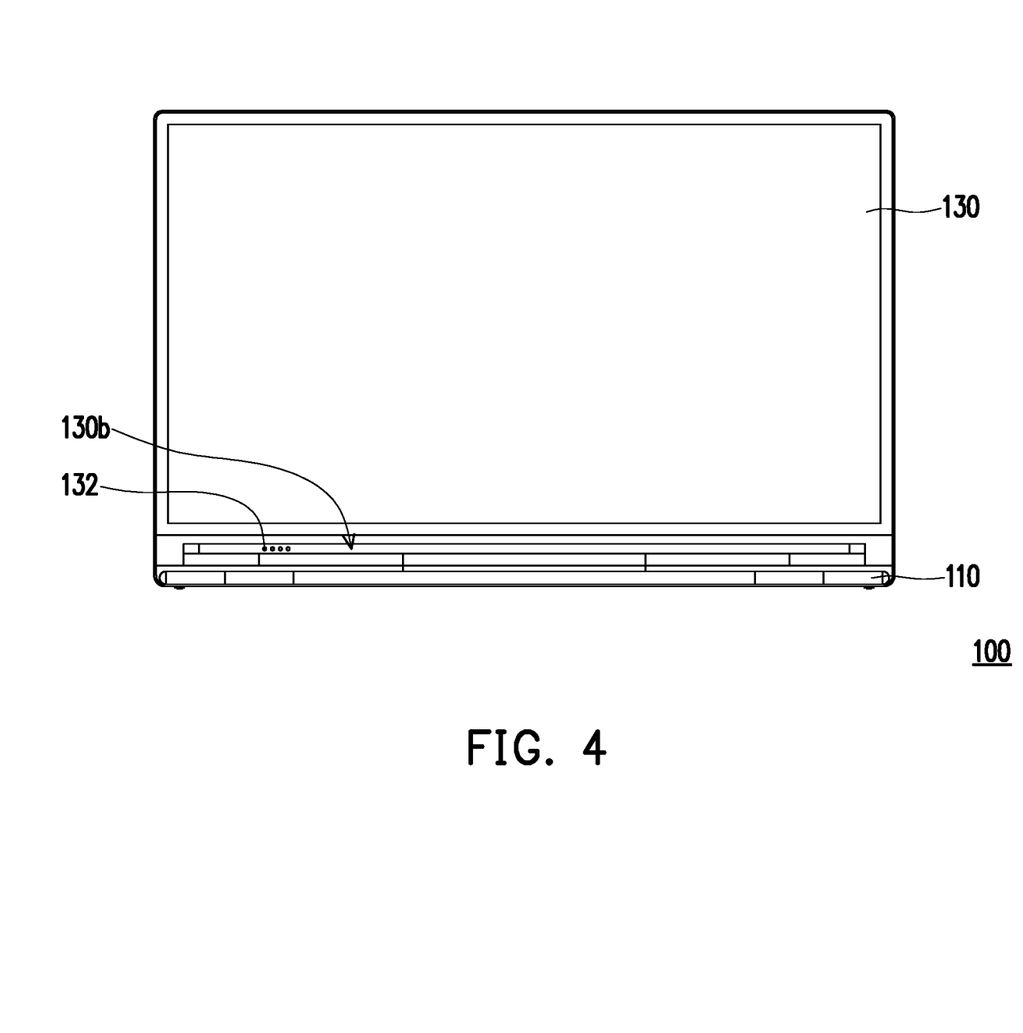
FIG. 4 is a front view of part of members of the electronic device of FIG. 3.

FIG. 3 is a top view of the electronic device of FIG. 2. FIG. 4 is a front view of part of members of the electronic device of FIG. 3. In order to make an electrical pin 132 of the second body 130 of FIG. 4 be clearly visible, the input assembly 140 is not shown in FIG. 4. Referring to FIG. 3 and FIG. 4, in the present embodiment, the rotating shaft part 140b of the input assembly 140 is provided with at least one electrical connection part 142 so as to be electrically connected to the electrical pin 132 at the concave groove 130b of the second body 130 through the electrical connection part 142. In detail, the electrical pin 132, for example, is a pogo pin. The electrical connection part 142, for example, is arranged on a surface of the rotating shaft part 140b to extend around an axial direction A of the rotating shaft part 140b, so that the electrical connection part 142 may be in contact with the electrical pin 132 continuously in the process that the rotating shaft part 140b rotates relative to the concave groove 130b.

Figure 5A:
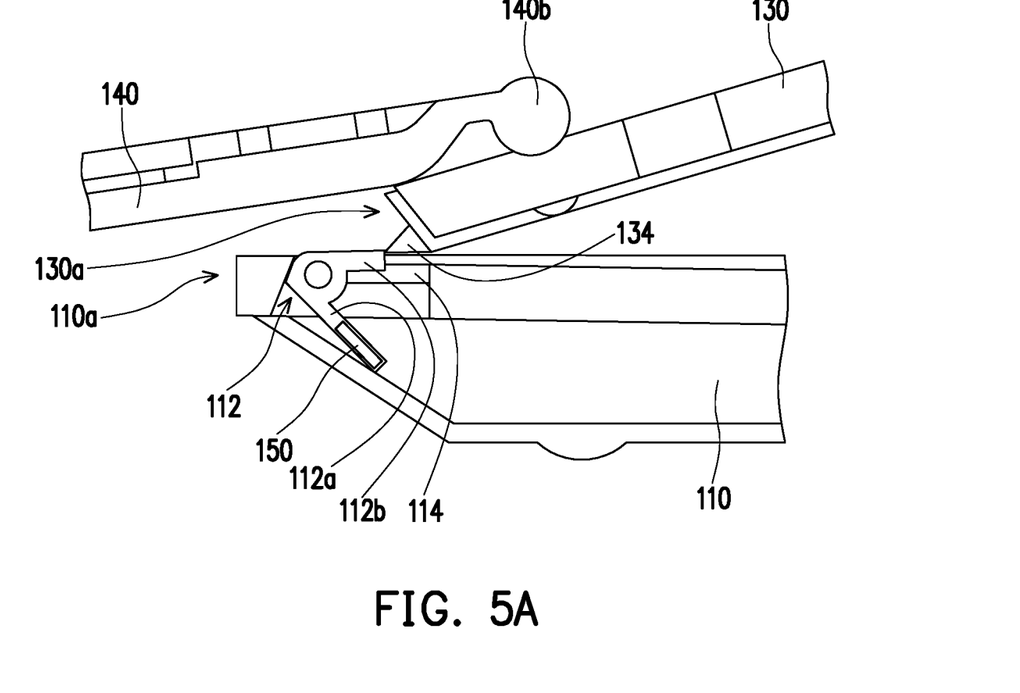
FIG. 5A and FIG. 5B illustrate a manner of positioning a lower edge of a second body of FIG. 2C at a front end of a first body.
Figure 5B:
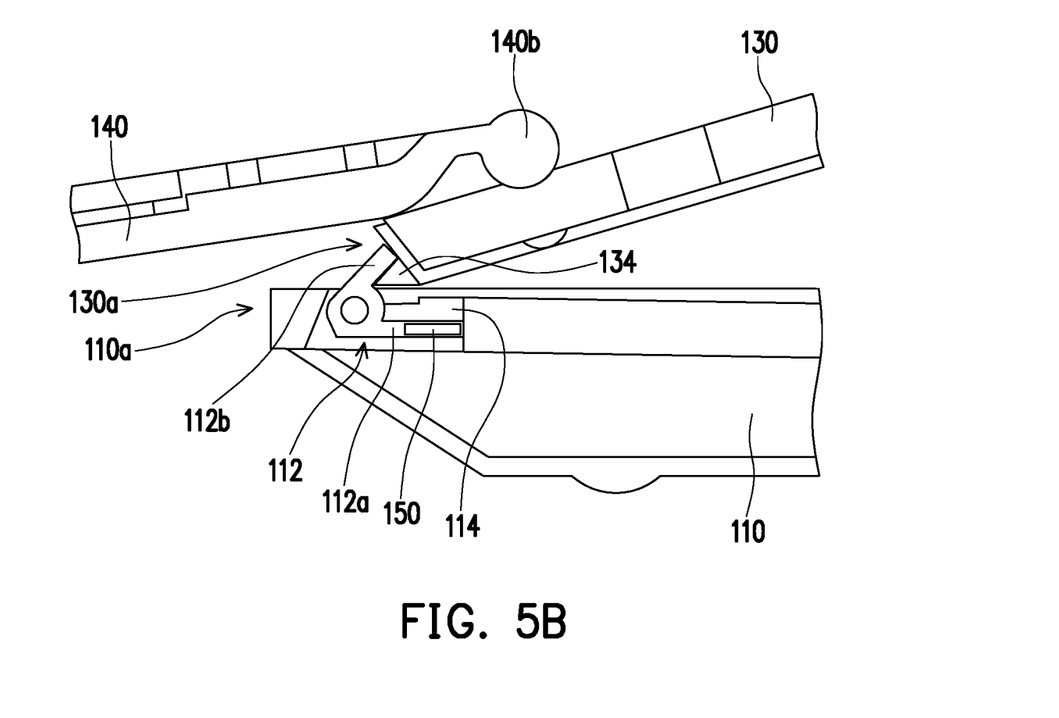

FIG. 5A and FIG. 5B illustrate a manner of engagement of the lower edge of the second body of FIG. 2C with the front end of the first body. Referring to FIG. 5A and FIG. 5B, the electronic device of the present embodiment includes a stop member 112 and a magnetic member 150. The stop member 112 is provided with a first arm part 112a and a second arm part 112b, and the stop member 112 is rotatably connected to the front end 110a of the first body 110. The magnetic member 150, for example, is a magnet and is disposed at the first arm part 112a of the stop member 112. The lower edge 130a of the second body 130 includes a metal material which may be magnetically attracted. When the lower edge 130a of the second body 130 is located at the front end 110a of the first body 110, the stop member 112 rotates as shown in FIG. 5A to FIG. 5B through a magnetic attraction force between the lower edge 130a of the second body 130 and the magnetic member 150 until the first arm part 112a is stopped by a stop part 114 of the first body 110. As such, the second arm part 112b of the stop member 112 protrudes from the first body 110 as shown in FIG. 5B and stops the lower edge 130a of the second body 130. Thus, the second body 130 is prevented from unexpectedly sliding to the front of the first body 110 continuously. Further, the second body 130 of the present embodiment is provided with an engaging convex part 134 at the lower edge 130a thereof. When the stop member 112 partially protrudes from the first body 110 as shown in FIG. 5B, the engaging convex part 134 of the second body 130 is suitable for being engaged between the second arm part 112b of the stop member 112 and the first body 110.

In other embodiments, the magnetic member 150 may be disposed at the lower edge 130a of the second body 130, and the first arm part 112a of the stop member 112 may include a metal material which may be magnetically attracted by the magnetic member 150. Alternatively, the lower edge 130a of the second body 130 and the first arm part 112a of the stop member 112 may be both provided with magnets to magnetically attract each other, and the disclosure is not limited thereto. In addition, in other embodiments, the lower edge 130a of the second body 130 may be stopped and positioned at the front end 110a of the first body 110 through other appropriate manners, and the disclosure is not limited thereto.

Based on the foregoing, in the electronic device of the disclosure, the input assembly is not fixed onto the first body and is rotatably connected to the second body instead. When the lower edge of the second body moves to the front end of the first body along the first body so that the second body is provided with a large inclination angle, the input assembly is then pushed to the front of the first body by the second body to protrude out from the front end of the first body. Accordingly, when the second body has a large inclination angle, the input assembly is not concealed between the first body and the second body and may still be operated by the user.

What is claimed is:

1. An electronic device, comprising:
a first body, provided with a front end and a rear end opposite to each other;
a supporting member, with one terminal end pivotally connected to the rear end of the first body;
a second body, pivotally connected to the other terminal end of the supporting member; and
an input assembly, rotatably connected to the second body and suitable for being carried by the first body, wherein when a lower edge of the second body is located at the front end of the first body, the input assembly protrudes out from the front end of the first body and is inclined relative to the first body,
wherein with pivoting of the supporting member relative to the first body and pivoting of the second body relative to the supporting member, the lower edge of the second body moves to the front end of the first body along the first body,
wherein when the second body is opened up from the first body with the supporting member, the input assembly is carried by the first body, and a gap is provided between a free end of the input assembly away from the second body and the front end of the first body.

2. The electronic device according to claim 1, wherein one of the second body and the input assembly is provided with a rotating shaft part, and the second body and the input assembly are interconnected through the rotating shaft part.

3. The electronic device according to claim 2, wherein the rotating shaft part and the other one of the second body and the input assembly are suitable for generating a magnetic attraction force to magnetically attract each other.

4. The electronic device according to claim 2, wherein the rotating shaft part is provided with at least one electrical connection part, the at least one electrical connection part extends on a surface of the rotating shaft part around an axial direction of the rotating shaft part, and the input assembly is electrically connected to the second body through the at least one electrical connection part.

5. The electronic device according to claim 4, wherein the at least one electrical connection part is disposed on the surface of the rotating shaft part.

6. The electronic device according to claim 5, wherein the at least one electrical connection part extends around the axial direction of the rotating shaft part.

7. The electronic device according to claim 1, wherein when the second body is closed down on the first body, the supporting member is received at an outer side of the second body, and the input assembly is received between the second body and the first body.

8. The electronic device according to claim 1, wherein when the supporting member is opened up from the first body, the second body is suitable for being opened up from the supporting member so that the lower edge of the second body abuts against the first body, and the free end of the input assembly away from the second body moves to the front end of the first body.

9. The electronic device according to claim 1, comprising a stop member, wherein the stop member is disposed at the front end of the first body, and when the lower edge of the second body is located at the front end of the first body, the stop member stops the lower edge of the second body.

10. The electronic device according to claim 9, wherein the stop member is rotatably connected to the first body and is suitable for rotating to at least partially protrude from the first body, so as to stop the lower edge of the second body.

11. The electronic device according to claim 10, comprising a magnetic member, wherein the magnetic member is disposed at one of the stop member and the lower edge of the second body, and the stop member is suitable for rotating through a magnetic attraction force between the magnetic member and the other one of the stop member and the lower edge of the second body.

12. The electronic device according to claim 11, wherein the stop member is provided with a first arm part and a second arm part, the magnetic member is disposed at the first arm part, and the second arm part is suitable for protruding from the first body and stopping the lower edge of the second body with rotating of the stop member.

13. The electronic device according to claim 10, wherein the second body is provided with an engaging convex part at the lower edge, and when the stop member at least partially protrudes from the first body, the engaging convex part is suitable for being engaged between the stop member and the first body.

* * * * *